Figure 1:
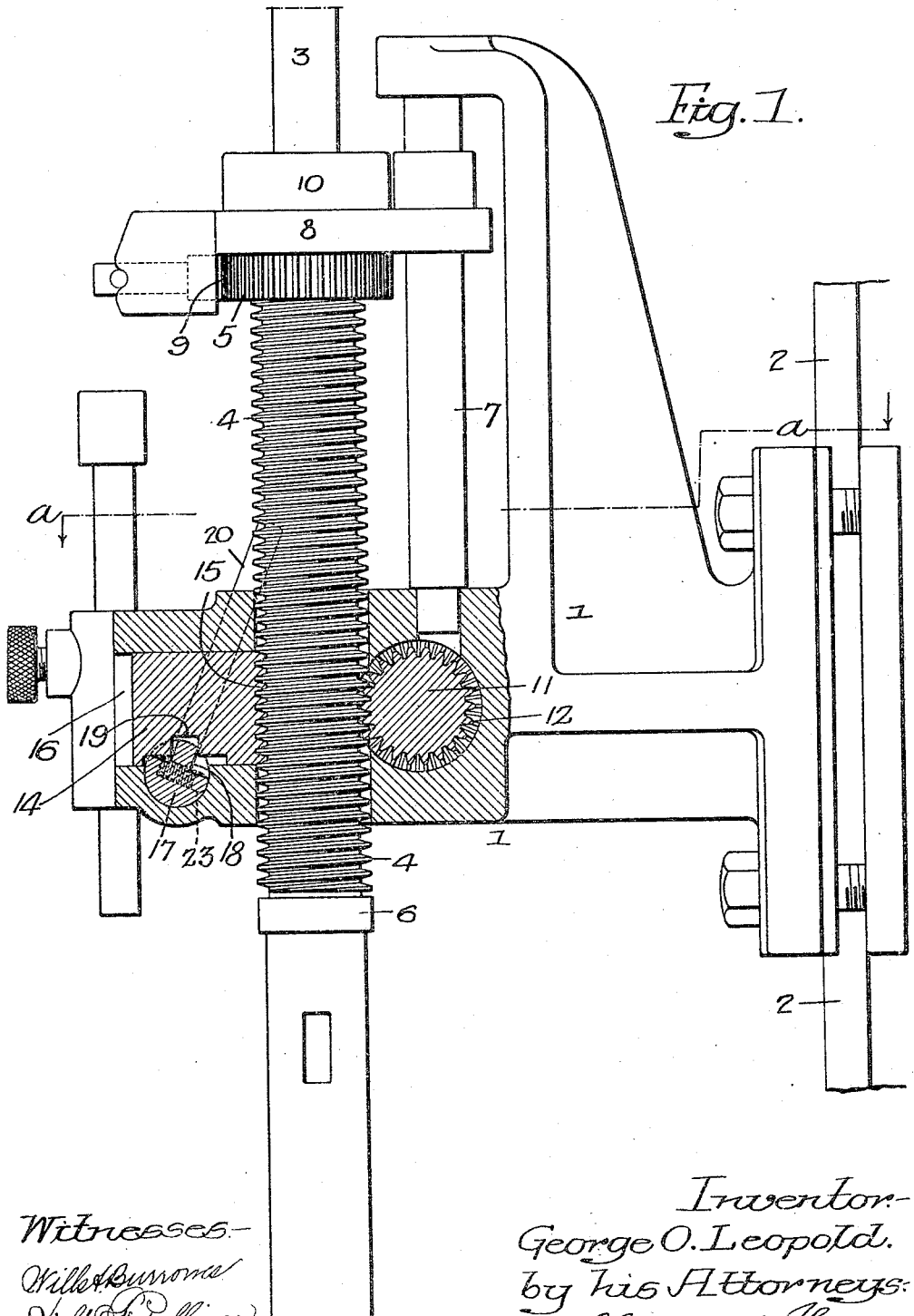

G. O. LEOPOLD.
FEED MECHANISM FOR DRILL SPINDLES.
APPLICATION FILED SEPT. 3, 1914.

1,124,149.

Patented Jan. 5, 1915.
2 SHEETS—SHEET 1.

Inventor:
George O. Leopold.
by his Attorneys:
Howsm & Howsm

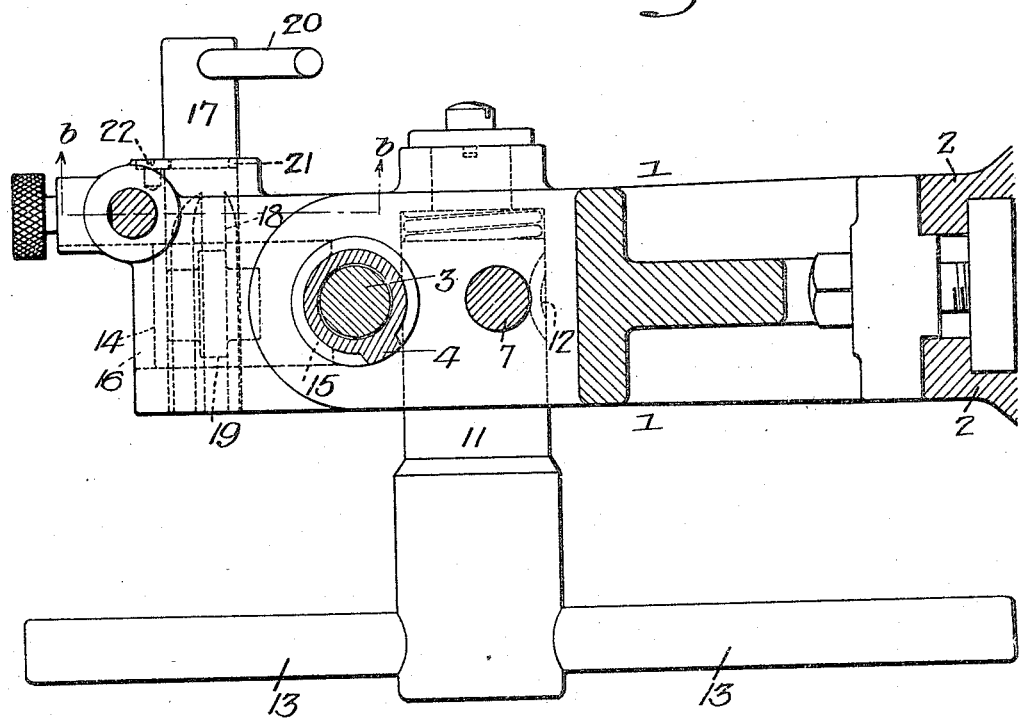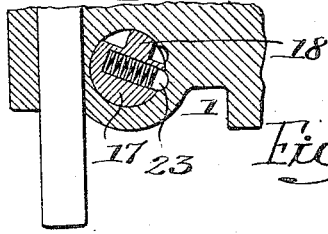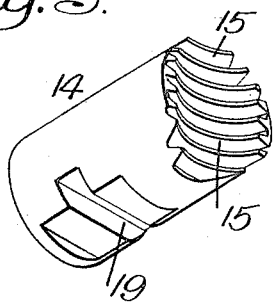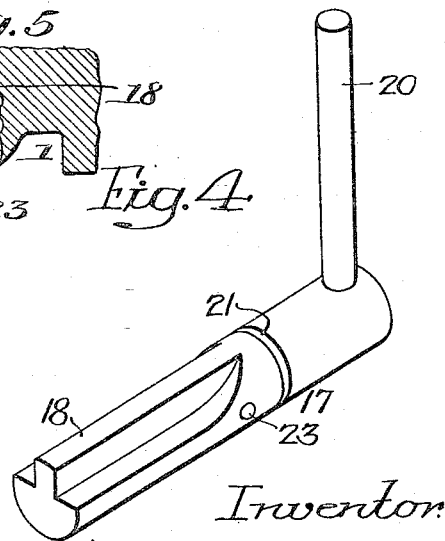

UNITED STATES PATENT OFFICE.

GEORGE O. LEOPOLD, OF PHILADELPHIA, PENNSYLVANIA, ASSIGNOR TO NORTH BRO'S. M'F'G CO., OF PHILADELPHIA, PENNSYLVANIA, A CORPORATION OF PENNSYLVANIA.

FEED MECHANISM FOR DRILL-SPINDLES.

1,124,149.           Specification of Letters Patent.         Patented Jan. 5, 1915.

Application filed September 3, 1914. Serial No. 860,025.

*To all whom it may concern:*

Be it known that I, GEORGE O. LEOPOLD, a citizen of the United States, residing in Philadelphia, Pennsylvania, have invented certain Improvements in Feed Mechanism for Drill-Spindles, of which the following is a specification.

My invention relates to certain improvements in the feed mechanism of drills of the type illustrated in a pending application for patent filed by me on the 13th day of June 1914, under Serial No. 844,931.

The object of the present invention is to provide a more substantial construction of feed mechanism than heretofore by utilizing a block having a series of segmental teeth which engage the threads of the feed screw.

In the accompanying drawings:—Figure 1, is a vertical sectional view of the bracket of a drilling machine, showing sufficient of the feed mechanism to illustrate my invention; Fig. 2, is a sectional plan view on the line a—a, Fig. 1; Fig. 3, is a detached perspective view of the toothed block which forms the nut for the feed screw; Fig. 4, is a detached perspective view of the rocker for holding the toothed block into and out of engagement with the feed screw; and Fig. 5 is a sectional view on the line b—b, Fig. 2.

Referring to the drawings, 1 is a bracket which is secured to the post 2 of a drilling machine of the type illustrated in the above mentioned application.

3 is the main spindle of the drilling machine which carries a chuck or other tool holder.

4 is a feed screw through which the spindle extends, and 5 is a ratchet wheel on the feed screw.

6 is a bearing on the spindle 3 against which the lower end of the feed screw rests.

Projecting upwardly from the bracket 1 is a rod 7 on which is pivotally mounted a carrier 8 having a pawl 9 which engages the ratchet wheel 5. Above the carrier is a collar 10, which is secured to the spindle so that the feed screw is held between the bearing 6 and the collar 10.

11 is a transversely arranged feed spindle having teeth 12 which engage the threads of the feed screw 4. This spindle has a handle 13 by which it can be turned so as to quickly raise and lower the feed screw and spindle toward and from the work.

14 is a block, illustrated clearly in Fig. 3, having teeth 15 at the inner end. These teeth are curved to correspond with the curvature of the feed screw 4 and are shaped so as to positively engage the feed screw, as clearly shown in Fig. 1, which illustrates the block in the projected position and which acts as a nut for the feed screw. This block is cylindrical in the present instance and is adapted to a cylindrical opening 16 in the bracket 1. In order to move the block into and out of engagement with the feed screw 4, I provide a rocker bar 17 having a tongue 18, as clearly shown in Fig. 4. This tongue enters a notch 19 in the block 14, as illustrated in Fig. 1, and the rocker bar is provided with a handle 20 by which it can be shifted into either of its two positions. The rocker bar is grooved at 21 and the screw 22 has a head which enters the groove to keep the bar in position. Other means of preventing the longitudinal movement of the bar may be resorted to without departing from the essential features of the invention. In the present instance the bar is recessed to receive a ball 23 and this ball is adapted to enter notches in the wall of the bearing so as to lock the bar in its two extreme positions in order to prevent the accidental displacement of the block, see Fig. 5.

By the above construction, I am enabled to provide a number of teeth with which the feed screw meshes, instead of one tooth as illustrated in the above mentioned pending application. This increase in the number of teeth materially increases the strength of the mechanism and, as the pressure is intermittently exerted against the teeth, it is essential that this particular element be as substantial as possible.

This invention is particularly adapted for bench drills which are driven either by power or by hand and which are made to sell at a moderate price. The mechanism is so designed that the parts can be readily cast, only ordinary machine work being necessary to make an accurate tool.

I claim:—

1. The combination in a drill, of a bracket having an opening therein; a spindle carrying a feed screw extending through the opening; a block mounted in the bracket and having teeth at one end arranged to engage the threads of the feed screw; means for moving the block into and out of engagement with the feed screw; a hand operated toothed spindle in the bracket opposite the block; and a handle by which the said spindle can be turned.

2. The combination in a drill, of a bracket having an opening therein; a spindle carrying a feed screw mounted in the opening; means for turning the feed screw; a block mounted in the bracket and having teeth at one end engaging the threads of the feed screw; and a transversely arranged rocking bar having a tongue engaging the block so as to move the block into and out of engagement with the feed screw.

3. The combination in a drilling machine, of a bracket having an opening therethrough; a spindle carrying a feed screw mounted in the opening; ratchet mechanism for turning the feed screw; a block having curved teeth at one end to engage the threads of the feed screw so as to act as a nut for the screw; a transversely arranged rocking bar having a tongue, the block being notched to receive the tongue; and a handle for the rocking bar; with a hand actuated spindle having teeth also engaging the threads of the feed screw so that, when the block is withdrawn from engagement with the feed screw, the screw and the spindle can be manually adjusted by turning the toothed spindle.

In testimony whereof, I have signed my name to this specification, in the presence of two subscribing witnesses.

GEORGE O. LEOPOLD.

Witnesses:
Jos. H. KLEIN,
WM. A. BARR.

Copies of this patent may be obtained for five cents each, by addressing the "Commissioner of Patents Washington, D. C."